(No Model.)  7 Sheets—Sheet 1.

C. B. HOPKINS.
CASH INDICATOR, REGISTER, AND RECORDER.

No. 385,265.  Patented June 26, 1888.

Witnesses:
Jas. E. Hutchinson.
Henry C. Hazard.

Inventor.
C. B. Hopkins.
by Prindle and Russell
his attorneys.

(No Model.)

C. B. HOPKINS.

CASH INDICATOR, REGISTER, AND RECORDER.

No. 385,265. Patented June 26, 1888.

(No Model.) 7 Sheets—Sheet 3.
C. B. HOPKINS.
CASH INDICATOR, REGISTER, AND RECORDER.

No. 385,265. Patented June 26, 1888.

Fig. 3.

(No Model.) 7 Sheets—Sheet 4.

C. B. HOPKINS.
CASH INDICATOR, REGISTER, AND RECORDER.

No. 385,265. Patented June 26, 1888.

Fig. 4.

Witnesses:
Jas. E. Hutchinson
Henry C. Hazard

Inventor:
C. B. Hopkins,
by Prindle and Russell
his Attorneys.

(No Model.)

C. B. HOPKINS.
CASH INDICATOR, REGISTER, AND RECORDER.

No. 385,265. Patented June 26, 1888.

(No Model.) 7 Sheets—Sheet 6.

C. B. HOPKINS.
CASH INDICATOR, REGISTER, AND RECORDER.

No. 385,265. Patented June 26, 1888.

(No Model.) 7 Sheets—Sheet 7.
C. B. HOPKINS.
CASH INDICATOR, REGISTER, AND RECORDER.

No. 385,265. Patented June 26, 1888.

Witnesses:
Jas. E. Hutchinson
Henry C. Hazard

Inventor
C. B. Hopkins,
by Prindle and Russell
his Attorneys.

N. PETERS, Photo-Lithographer, Washington, D. C.

UNITED STATES PATENT OFFICE.

CABEL B. HOPKINS, OF LOUISVILLE, KENTUCKY.

CASH INDICATOR, REGISTER, AND RECORDER.

SPECIFICATION forming part of Letters Patent No. 385,265, dated June 26, 1888.

Application filed July 3, 1886. Serial No. 207,096. (No model.)

*To all whom it may concern:*

Be it known that I, CABEL B. HOPKINS, of Louisville, in the county of Jefferson, and in the State of Kentucky, have invented certain new and useful Improvements in Cash Indicators and Registers; and I do hereby declare that the following is a full, clear, and exact description thereof, reference being had to the accompanying drawings, in which—

Fig. 3, a front elevation of my apparatus with the front of the casing and the indicator-wheel removed; Fig. 7ª, a detail sectional view of a portion of the indicator-wheel, showing one of the indicator-slides; Fig. 8ª, a detail view of a section of one of the register-wheels on a plane parallel to its sides.

Letters of like name and kind refer to like parts in each of the figures.

The object of my invention is to provide an improved indicating apparatus which will not only indicate but will also print or stamp a slip or piece of paper, so that the same can be used as a check, showing the amount indicated; and to these ends my invention consists in the apparatus and in the construction, arrangement, and combination of parts thereof, as hereinafter specified.

In the drawings, A designates the casing of the apparatus, in the front A' of which is the circular opening $A^2$ and the offset or slot $A^3$ at the top of such opening. The lower portion of this slot or offset is rounded or beveled on the left side at $a$, as shown, for a purpose to be hereinafter set forth.

Attached to the bottom of the casing are the two upright parallel standards B B, braced and held rigidly parallel with each other by suitable bars or braces, B' B'. Journaled in the front one of these standards, in line with the center of the opening $A^2$, is the shaft C, upon the front end of which is fixed the indicator-wheel D, situated just within or to the rear of the casing-front A', and of greater diameter than the opening $A^2$, so as to overlap its edge all around. As shown in the drawings, this wheel is formed of two parallel metal plates having around their edges corresponding series of radial slots, $d\ d$.

To stiffen the plates and at the same time close the outer ends of the slots, I solder or otherwise fasten a wire, $d'$, around the edge of each plate. I do not, however, limit myself to such construction, as the plates can be made of material stiff enough without the wires, and the outer ends of the slots can be closed in any desired way.

Attached to the front one of the two plates of the wheel D within and concentric with the inner ends of the slots $d\ d$ is the ring or annular flange D', having a series of holes, $d^2\ d^2$, in the same radial planes with the corresponding slots $d\ d$. Also attached to the front plate are the plates $d^3\ d^3$, parallel with and alongside the slots $d\ d$. At the outer ends of these plates are the plates $d^4\ d^4$, standing at right angles to them and provided with the holes $d^5\ d^5$, radially in line with the holes $d^2\ d^2$ in ring or flange D'. There are also attached to the front plate the distance pieces or blocks $d^6\ d^6$, to which the rear plate of wheel D is screwed. In the corresponding holes $d^2\ d^2$ and $d^5\ d^5$ are guided the reciprocating rods or short bars D² D², carrying on their outer ends the indicator-plates D³ D³, marked with the desired numbers or figures to be displayed.

Passing through each rod D² and projecting out through the corresponding radial slots in both plates of the wheel is a pin or rod, D⁴, bearing on its front end a suitable knob or plate numbered or marked the same as the plate on the rod D².

To retract each rod D² when it has been pushed out radially with reference to wheel D, I provide a spiral retracting-spring, $d^7$, for each rod, preferably attached at its outer end to the plate or tablet on the rod and at its inner end to the ring or flange D'. Other forms of springs can of course be used for this purpose, engaging or attached to the indicator-rods themselves.

The pins D⁴ D⁴, projecting as they do through the slots in the plates of wheel D, prevent any rotation of the indicator rods or bars D² D², so that the display-tablets are always held with their faces in the same plane parallel with the face of the indicator-wheel.

If desired, the rear plate of the wheel D can obviously be dispensed with, all the necessary guides for the indicator bars or rods being attached to the front plate.

I do not desire or intend to limit myself to the construction of the wheel as shown and described herein. Its construction and that of the guiding and holding devices for the indicator-rods can be varied as desired without departure from my invention. Vertically over wheel D is a slot or opening, A⁴, in the top of the casing. When the indicator-rods and display-tablets are in their normal retracted positions, as the wheel is turned the upper edges of the tablets pass just below the casing-top out of sight.

The circular opening A² in the casing front is of such diameter that the pins D⁴ D⁴, for actuating the indicator-rods when such rods are in their normal position, are just inside its edge. None of these pins can then be moved outward radially until it is brought by rotation of the wheel up into line with the offset or slot A³ at the top of opening A², for at all other points the edge of the opening will effectually stop the outward movement of the pin. With this construction the wheel is free to revolve in either direction, the series of pins D⁴ D⁴ passing around close to the edge of the opening in the casing-front, and each pin is free to be moved outward when it arrives at the top of the wheel below the slot in the casing-top, but is locked against all outward movement at other points of its travel as the wheel revolves.

To display any desired tablet above the casing-top, the respective knob bearing the mark or number of such tablet is grasped and moved around to rotate the wheel until it comes below or in line with the slot A³ in the casing-front, and is then pushed upward, so as to move the tablet up through the opening in the casing-top.

Figure 1:
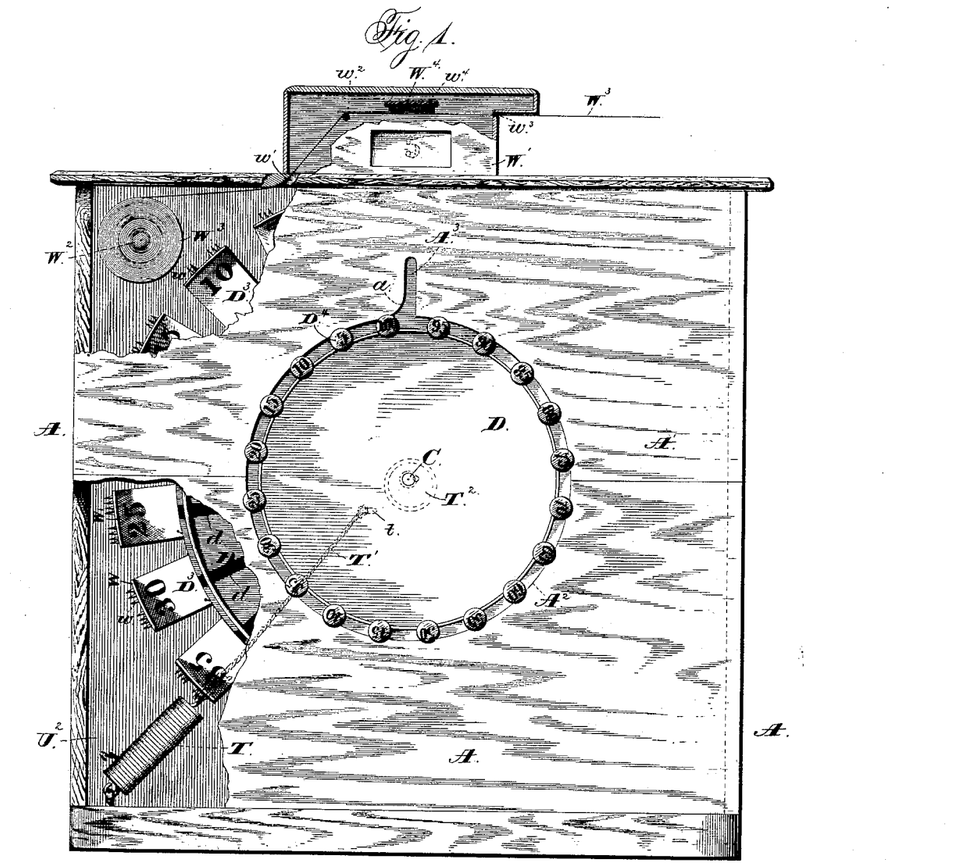
Figure 1 shows a view, in front elevation, of my apparatus with parts broken away to show the mechanism more clearly.

I have shown the wheel D provided with twenty display-tablets with their projecting and retracting devices. These tablets and the corresponding actuating-knobs are numbered 5, 10, 15, 20, and so on, up to and including 100, so as to adapt the apparatus for indicating amounts of cash, beginning at five cents and increasing successively by five cents up to one dollar. It will be understood, however, that I do not limit myself to any particular number of the tablets and rods. The number can be increased or diminished to suit any circumstances, and the markings on the tablets and knobs can be correspondingly varied.

Figure 5:
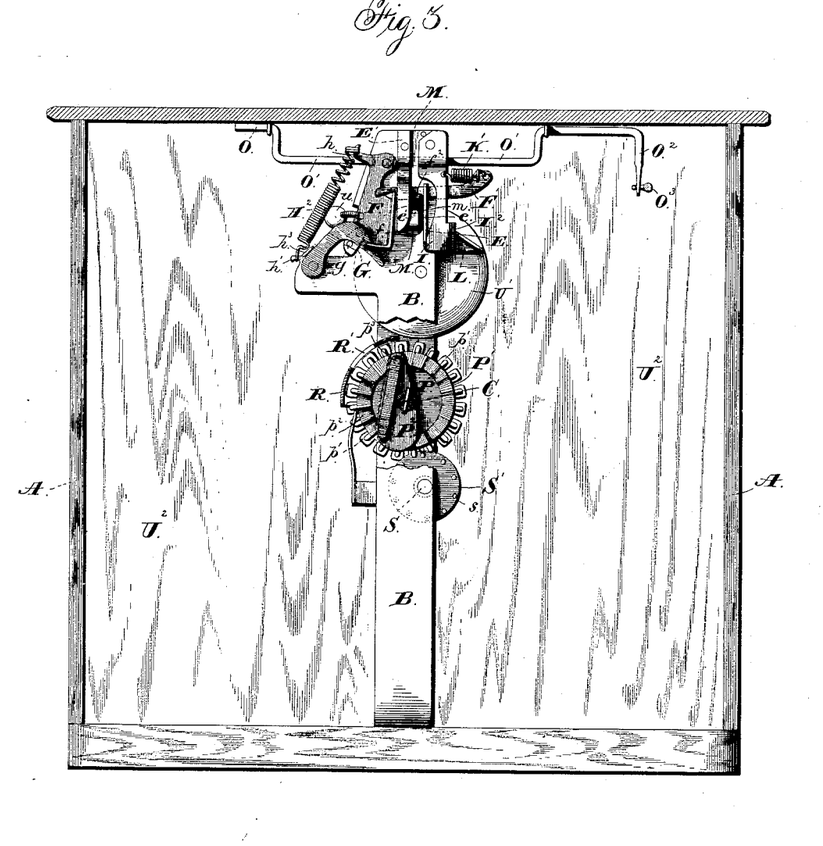
Fig. 5, a detail view, in front elevation, showing the parts of the pawl-locking mechanism as in position when an indication is to be made.
Figure 6:
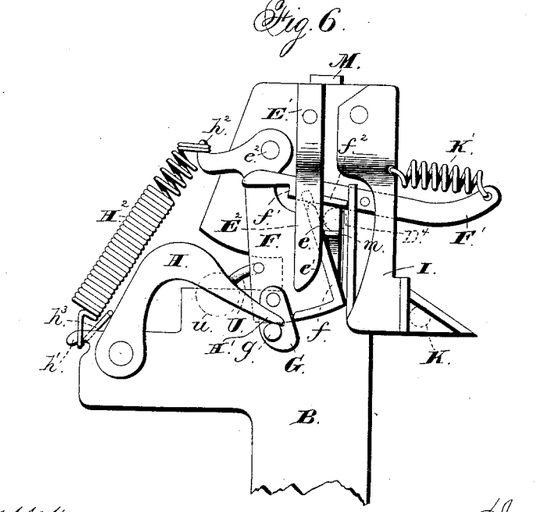
Fig. 6, a similar view of the same, showing in full lines the parts in position as they are when an indication has been made and the indicator-slide is held elevated, and in dotted lines as when the slide is dropped and the wheel is returning to its normal position.

To hold any tablet elevated and to prevent backward turning of the wheel until an indication has been made, I have provided the following mechanism: The inner or rear ends of the pins D⁴ D⁴ pass close to the front standard, B, as the wheel D revolves. Upon this standard, in line with the right-hand side of the slot A³ in the casing-front, is the upright rib E, having its lower end so situated that the retracted pins D⁴ D⁴ just pass it. Attached to the standard B is the piece E', having the arm E² extending downward parallel to and at a distance from the front of the standard. The right-hand side of this arm is parallel to the rib E and so situated with reference to the latter as to leave a passage, $e$, up which any one of the pins D⁴ D⁴ can be moved. The lower end of this arm is beveled, as shown at $e'$, to guide the pin into such passage. Pivoted at $e^2$ to the standard B is the swinging plate F, provided on its inner side with the flange or rib $f$, whose upper end is, as shown in Figs. 5 and 6, engaged by the shoulder $f'$ on the pawl-lever F', so as to hold the plate F normally swung over to the left. This lever has a lug or pin, $f^2$, situated in the passage $e$, so as to be struck by any one of the pins D⁴ D⁴ which may be moved up the passage. Pivoted to the heel of the plate F is the pawl G, standing out of the track of the pins D⁴ D⁴ as the wheel is revolved, while the plate is held swung outward, as shown in Fig. 5. This pawl is so hung as to be capable of freely swinging outward, but not inward. Upon a pin or lug, $g$, on this pawl rests the arm of the larger pawl, H, which is pivoted to a rigid arm on standard B below and to the left of the pawl G. The arm H' of this pawl is of such length that its inner end projects into the path of the pins D⁴ D⁴ as the wheel D revolves. As each pin engages it, it will rise and then drop down behind the pin, so as to prevent any backward turning of the wheel. To assist its action as a pawl, I provide the spring H², hooked at one end to a projection or stud, $h'$, on the standard and at the other to an arm, $h^2$, on the swinging plate F. The end $h^3$ of the wire forming this spring is bent so as to bear against the outer side of pawl H. With this construction the spring H² serves to swing the plate F inward on its pivot and also to operate the pawl H.

When the plate F is released by raising the pawl-lever F', it flies inward, so that its lower inward corner rests against the fixed rib E on the standard. By such movement of the plate the pawl G is carried inward, and the pin or lug $g$ thereon rides under the arm H' of pawl H and lifts it, as shown in Fig. 6, so as to raise its inner end out of the track of the pins $D^4 D^4$. The pawl G then takes the place of pawl H in engaging such pins, allowing the pins to be moved by the backward rotation of the wheel to the left, but preventing their movement in the opposite direction. As the arm H' of pawl H still rests upon the stud or pin $g$ on pawl G, it will transmit the stress of the spring $H^2$ to such latter pawl, so that no special spring for the pawl G is necessary.

Upon the standard B, on the side of passage $e$ opposite to the plate F, is pivoted the plate I, having its lower end adapted to swing inward over the rib E on the standard, and at its outer side provided with a rib or lip, $I^2$, adapted to be struck by the fixed pin K on the wheel D, outside of the circle of the pins $D^4 D^4$. This pin is situated on the wheel between the slots, in which play the pins $D^4 D^4$, for actuating the ninety-five-cent and the one-dollar indicator-rods.

A spring, K', attached to the outer end of the pawl-lever F' and to the plate I, serves normally to draw or swing the plate outward, as shown, and to actuate the pawl-lever to cause it to catch and hold the shoulder on plate F. A fixed stop, L, on the standard serves to limit the outward swing of plate I.

With the parts in position, as shown in Fig. 6, if the wheel D be turned to the left until the pin K strikes the rib or lip $I^2$ on plate I and moves it and the plate inward, the toe of the plate will engage the plate F and swing it outward until the pawl-lever catches and holds it, as set forth hereinbefore.

Attached to the rear side of the front standard, B, is the spring-plate M, having the pawl-lug $m$ projecting through an opening in the standard into position to engage and hold elevated any pin $D^4$ raised up through passage $e$, so as to engage and lift the lug on the pawl-lever to cause such lever to release plate F. The rib or lip $I^2$ on plate I is engaged by the pin K when the wheel D is rotated to the right, so as to bring the one-dollar or highest indicator plate and rod into position to be lifted. The wheel cannot then be turned beyond such point to the right, because of the plate striking the stop L. Pressing against the rear of the spring-plate M is the spring N around the guide or steady rod N', attached to the spring-plate and guided in an opening in the rear standard B. To engage and press the plate M rearward to withdraw its pawl-tooth $m$ from the passage $e$, I provide, pivoted in suitable sockets or bearings on the casing-top, the rock-shaft O, having the portion O', engaging the plate M and the arm $O^2$, to which is connected the push-rod $O^3$, extending out through the casing front.

The lower end of the plate I is, as shown, made of such extent from the rib $I^2$ to the toe for engaging and setting the plate F that when the pin K on the wheel D is in engagement with the outer or right side of rib $I^2$ the lower end of the plate will be in the way of and prevent the one-hundred or one-dollar pin $D^4$ from being raised up in passage $e$. To make it possible to raise this pin to display the indicator-tablet, the wheel must then be turned through one full revolution. This is essential for the proper registration of the amount indicated, as will be described hereinafter. The lower end of plate F, when such plate is swung inward, as shown in Fig. 6, effectually stops the passage $e$ against any upward movement therein of any of the pins $D^4 D^4$. Journaled in the rear standard B is the tubular shaft P, which, projecting forward, surrounds the shaft C of the wheel D, as shown in the drawings. The inner ends of the two shafts then mutually support each other.

Upon the shaft P are journaled the several register-wheels P', each of which has the plane numbered portion $p$ and the teeth $p' p'$ around its periphery. The first or front one of these wheels has on its forward face or side the series of ratchet-teeth $p^2 p^2$. Such ratchet-teeth are for my present apparatus twenty in number, to agree with the number of indicator-tablets.

Figures 7, 7A, 8, 8A:
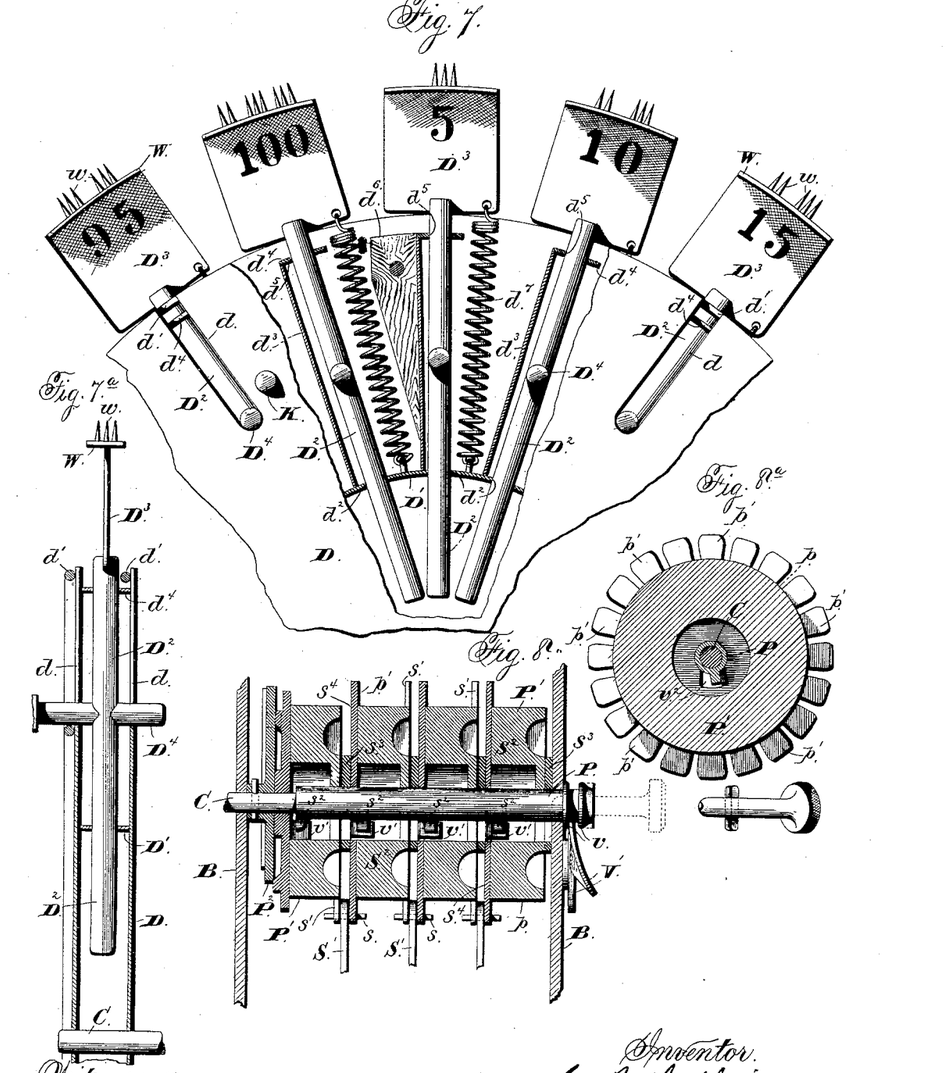
Fig. 7, a detail sectional view of a portion of the indicator-wheel.
Fig. 8, a detail sectional view of the registering mechanism, showing the means for setting the wheels.
Figure 9:
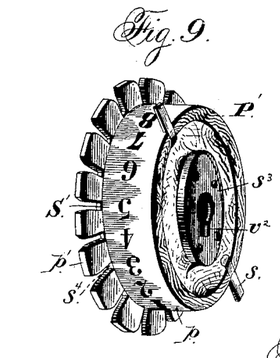
Fig. 9, a detail perspective view of one of the registering-wheels with its carrying-wheel.
Figure 10:
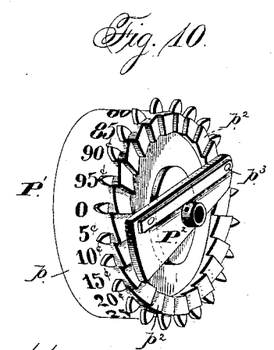
Fig. 10, a similar view of the first one of the series of wheels with its pawl-and-ratchet driving devices.

Attached to the shaft of wheel D, as shown, Figs. 3 and 8, is the pawl plate $P^2$, carrying the spring-pawl $p^3$, adapted to engage the ratchet-teeth $p' p'$ when the wheel D is turned forward, but to ride over such teeth freely as the wheel is turned backward. The plane portion of the periphery of the first wheel P' is divided into twenty divisions marked to correspond with the display or indicator tablets 5 10 15, &c., up to and including 95. The twentieth division is marked with a 0. With this construction, as the wheel D is turned forward to bring the display-tablets successively up into position to be raised, the first wheel P' will be correspondingly turned to bring the numbers on the wheel successively opposite a given point—that is, if the wheel D is turned sufficiently to bring the fifth or 25 tablet to the top of the wheel, the front wheel P' is turned through five divisions and remains there, while the wheel D turns back to its starting-point again. At the point where the cipher or zero on wheel P' was at first the number 25 will now be shown. If, now, the wheel D be turned forward again through ten of its divisions, the wheel P' will be turned correspondingly, and the fifteenth number, or 75, will be shown.

For facilitating the reading of the numbers registered by the wheels P' P', I have provided a shield or plate, R, having a slot, R', through which the numbers on the wheels can be read. The two wheels in rear of the front one have the plane portions of their peripheries divided into twenty numbered divisions; but the numbers do not run up to twenty. Diametrically opposite each other on each of these wheels are ciphers or zero-marks, and the numbers between such marks run from 1 to 9, inclusive. The rear wheel is numbered from 1 to 19, inclusive, with a 0 between the 1 and 19. I do not limit myself to this way and manner of dividing and numbering the wheels.

Journaled upon the shaft S, supported in the standards B B below the shaft C, are the wheels S' S', each one having ten pins, $s\ s$, projecting from its opposite sides near its edge. The pins on the rear sides of each of these wheels engage or mesh with the teeth $p'\ p'$ on the wheels P' P', those on the first one of wheels S' S' meshing with the second one of wheels P' P', as shown. The front one of wheels P' has a tooth, $s'$, which engages and moves one of the pins on the first wheel S' as the zero-mark on the former wheel comes opposite the reading-slot R'.

At each complete revolution of the front wheel P' the first wheel S', and consequently the second wheel P', will be moved one tooth or space. The two wheels P' P' in rear of the front one are provided each with two teeth, $s'\ s'$, adapted to engage the pins on the corresponding wheels S' S' when the two zero-marks on wheels P' P' are brought around to the reading-slot. With this construction the wheel P' will indicate the cents, the second wheel the dollars up to ten, the third wheel the tens of dollars, and the fourth wheel the hundreds of dollars up to nineteen.

By change in the dividing and numbering of the register-wheels they can obviously be adapted for any desired kind of registering.

To automatically return the wheel D to its normal starting position after it has been turned and released, I provide the spring T, connected by a cord, T', with a loop or lug, $t$, upon the rear side of the wheel. On the shaft C, between the wheel and the front standard B, I place a grooved pulley, $T^2$, around which the cord T' is wrapped when the wheel has been turned to carry the loop $t$ over beyond a vertical line through shaft C. If the spring were to pull directly upon the wheel all the time, its stress, when the wheel had been much revolved, would be too great and would turn the wheel backward with too much force. With my arrangement, however, when the wheel has been turned so that the cord begins to wrap around the pulley, the stress of the spring is only slightly increased as the wheel is turned farther, as the spring only has to stretch enough farther to allow cord enough to wrap around the pulley. When the spring is most stretched and exerts the greatest power, its power is applied to turn the wheel in such a way as to have the least leverage.

The operation of my mechanism, as far as described hereinbefore, is as follows: Under the stress of the spring T the wheel D normally stands with the pin K resting against the rib $I^2$ on the plate I, so as to swing said plate inward across the passage $e$, as shown in Fig. 6. The toe of the plate I then engages the rib $f$ on plate F and forces said plate outward, so that it is caught and held by the pawl-lever F', as hereinbefore described. The one-hundred tablet, or the one highest marked, now stands to the left of the slot at the upper side of opening $A^2$ in the casing-front. This tablet cannot be raised without turning the wheel clear around, because the lower end of the plate I stops any upward movement of its pin $D^4$. If the wheel be turned sufficiently to carry the pin K along, so that the plate I swings outward away from the pin-passage $e$, the pin of the one-hundred tablet is then beyond the slot $A^3$ and cannot be raised, and the five-tablet is brought up into position to be raised, if desired. The pawl H, riding over pin $D^4$, for raising such tablet and dropping behind it, prevents backward turning of the wheel. When the wheel has been turned forward to bring the desired tablet—as, for instance, the forty-cent one—into position to be elevated, the pin $D^4$ is pushed upward in slot $A^3$, and the tablet is displayed above the casing-top. As the rear or inner end of pin $D^4$ passes up passage $e$, it engages and pushes back the pawl-lug $m$ on the plate M, which flies out again under the pin, when it has passed, to lock it elevated. The pin also engages the lug $f^2$ on the pawl-lever F' and raises the latter. This releases the plate F, which swings quickly inward, thus elevating the pawl H out of operative position with relation to the pins $D^4\ D^4$ and bringing the pawl G down into position to engage such pins as they pass. In order to give an alarm when an indication is made, I provide the plate F with an arm, U, carrying a ball or hammer-head, $u$, and place a bell, U', in position to be struck and sounded by such head when the plate flies inward, as described above, upon the elevation of a tablet. During the turning of the wheel D the register-wheels have been turned accordingly, so as to register the amount indicated by the tablet. The pin $D^4$, for elevating the indicator-rod and tablet, is now held up by the pawl or lug $m$. To make ready for another indication, the plate M, carrying the pawl, is pushed back by means of the crank-shaft O O' and push-rod $O^3$. The pin $D^4$ being then released, the spring $d^2$ retracts the indicator rod and pin, and the wheel rotates quickly back to its normal starting position again. The plate F, being pressed inward by its spring, so as to stand across the passage $e$, yields to allow the downward passage of the pin $D^4$, and then prevents either that pin or any others from being elevated as long as it remains swung inward. The pawl G, engaging the pins $D^4\ D^4$, allows the wheel D to turn back, but prevents its forward rotation. The plate F remains blocking the passage $e$ with its lower end until the wheel D has been revolved back to its normal starting-point and the pin K has, as before, struck the flange or rib $I^2$ on plate I, swung the latter inward, and so carried the plate F outward to be caught and held by the pawl-lever F'. After each indication and registration the wheel D must be returned to its starting-point before a new indication and registration can be made.

It is impossible, then, to register any amount except that which is indicated.

Another result of my construction of apparatus is that no new registration can be made until the amount last registered is indicated. The wheel D cannot be turned to carry the highest tablet beyond the point of indication, so as to make it possible to indicate a smaller amount than that marked on such tablet, as the pin K strikes the rib or flange on plate I and is effectually stopped. The pawl H at the same time, by engaging one of pins $D^4$, prevents backward turning of the wheel. As the wheel cannot then be turned back until the pin $D^4$ has been raised to elevate the display-tablet, indication as well as registration of the highest amount must be made before any new amount can be indicated and registered.

At the end of the day the sum of the amounts indicated and registered can be read by opening the door $U^2$ at the back of the casing and reading the numbers on the register-wheels, which appear through slot R'.

Figure 2:
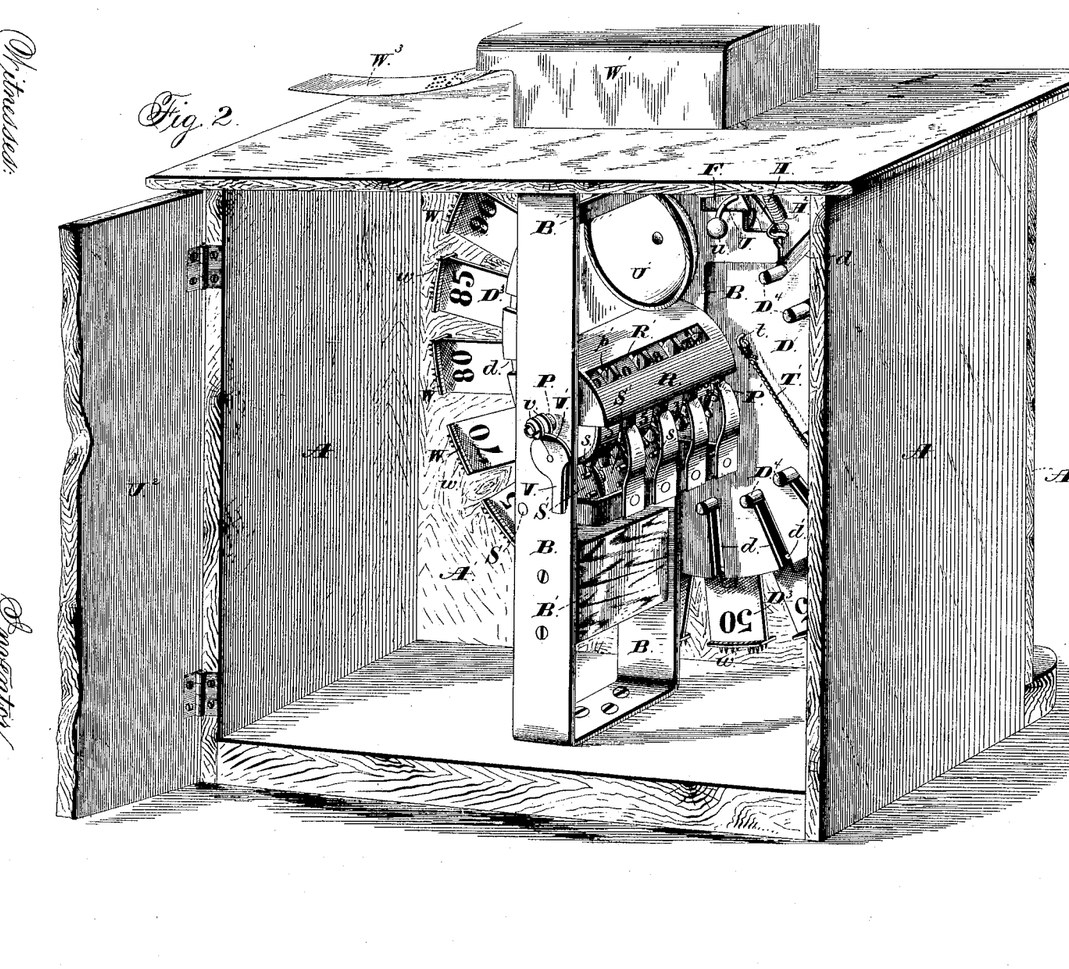
Fig. 2, a perspective view of the same from the rear, the back of the casing being removed.

To provide for setting the wheels all back to zero again, I place lugs $s^2$ $s^2$ on the shaft S—one for each wheel S'. The central portions of these wheels I hollow or cut out, so that when the hollow shaft P is drawn rearward, as shown in Fig. 2, the wheels clear these lugs and can revolve freely on the shaft. As a means for drawing the shaft rearward and holding it in such position, I provide the lever V, having the cam or spiral portion V' projecting between and engaging the two collars $v$ $v$ on the shaft. By swinging this cam-lever on its pivot the shaft S can obviously be drawn out or forced in. When the shaft is forced inward or forward, the lugs on the shaft are in position to engage lugs $v'$ $v'$—one on each of the wheels S' S'. When the shaft is drawn out, these lugs $v'$ $v'$ pass the lugs on the shaft as the wheels revolve on the latter. The wheels are each on opposite sides provided with the offsets $v^2$ $v^2$ (see Fig. $8^a$) from their journal-openings to allow the passage of the lugs $s^2$ $s^2$ on the shaft as the wheels are put on and taken off of the latter.

I show the wheels as formed of the central or main portion, $S^2$, with the small plate $s^3$ on one side, in which is the journal-opening, and on the other side the larger plate, $s^4$, also provided with the journal-opening and having the teeth $p'$ $p'$ formed upon it, but do not limit myself to such construction.

To set the wheels to zero, the shaft P is pushed inward or forward to bring the lugs $s^2$ $s^2$ in position to engage the lugs $v'$ $v'$ on the wheels when the shaft is rotated. The shaft is then turned until all the lugs $s^2$ $s^2$ engage lugs $v'$ $v'$, and then all the wheels are turned together. The lugs $v'v'$ are of course all correspondingly situated on the wheels with reference to the zero-marks on the latter. When all the wheels have been thus turned to bring the zeros under slot R', the shaft S is drawn out again, leaving the wheels free to be revolved.

It is desirable to provide checks having marked on them the various amounts indicated for the guidance of the cashier in receiving pay of the customer.

Instead of having previously-prepared checks in quantity, from which the right one is to be picked out, I provide means for printing a check each time that an indication is made. I therefore provide each of the display-tablets $D^3$ $D^3$ with a plate, W, on its upper edge, having on it puncturing-points $w$ $w$, arranged so as to prick or punch in a piece of paper the number or figures on the tablet. Over the slot or opening up through which the tablets are projected in making indications I place the small box or casing W', having the opening preferably closed with glass, through which the raised tablet can be seen.

Figure 4:
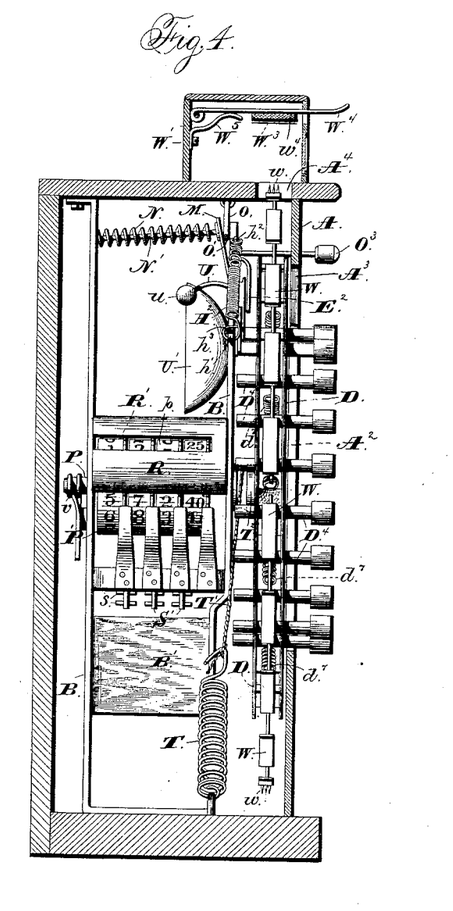
Fig. 4, a view, in side elevation, of the operative mechanism of the apparatus.
Figure 11:
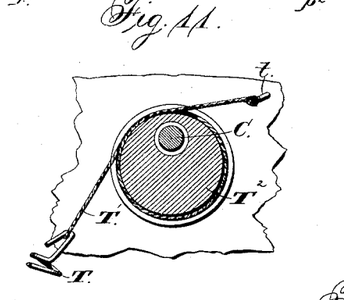
Fig. 11, a detail view of a portion of the indicator-wheel with the spring-returning mechanism therefor.
Figure 12:
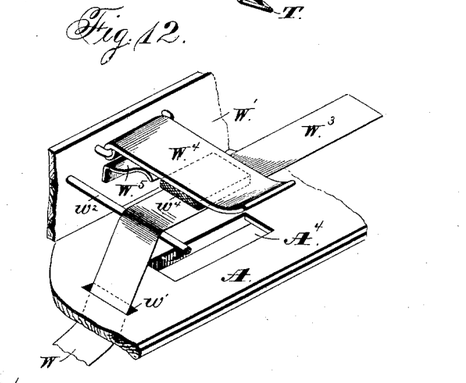
Fig. 12, a detail perspective view of the check printing or punching mechanism, and Fig. 13 a detail view of one of the indicator-tablets with its printing or punching device.
Figure 13:
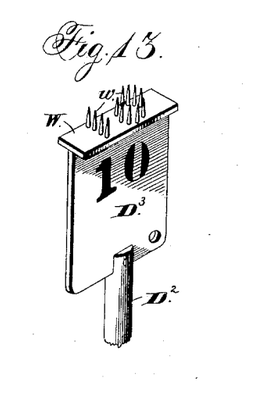

Within the casing of the apparatus, upon a suitable stud, $W^2$, is journaled a roll, $W^3$, of a continuous strip of paper. This strip passes up through a slot, $w'$, over a pulley or rod, $w^2$, within box or casing W', across over the slot in the main casing-top, and out through a slit, $w^3$, in the right-hand side of box W'. On its outer side the portion of this box above this slit is made to overlap the lower portion, so that if the strip of paper issuing from slit $w^3$ is torn off enough remains to give a good hold for drawing out more of the strip. Pivoted within the box W', at its rear side, is the lever $W^4$, extending forward across the slot in the main casing-top and out through the front of box W'. This lever is provided on its under side with the cushion $w^4$, of some soft or elastic material. A spring, $w^5$, serves to hold this lever normally elevated, as shown in Figs. 4 and 12. With this construction, when a tablet has been elevated to indicate a certain amount, the puncturing-points $w$ $w$ on its top stand just below the paper strip $W^3$. If, now, the lever $W^4$ be depressed, the number of the tablet will be pricked into the paper, for such paper will, by cushion $w^4$, be pressed down upon the points. The punctured or printed portion can then be drawn out, torn off, and used as a check. I do not limit myself to the puncturing-points as a means of marking on the paper. Sharp-edged type or ordinary type with a printing-ribbon or inking device can be used instead without departure from my invention. The grooved pulley $T^2$, fixed on the shaft C, is eccentric to such shaft, as shown in the drawings. It is arranged on said shaft so that when the wheel is at rest in its normal starting position the greatest diameter of the pulley is below the shaft, as indicated clearly in Figs. 1 and 11. With this construction, as the wheel is turned forward, the cord will first begin to wrap around the part of the pulley having the greatest radius. The spring will then, while little expanded, and having, therefore, little power, have the greatest leverage to turn the pulley, and so the shaft and wheel. As the wheel is turned farther, and the spring is more extended, parts of the pulley, of shorter and shorter radius, are brought around to the side of the shaft upon which is the spring, so as to diminish the leverage upon the pulley and shaft to turn the wheel back. Thus the increase in stress of the spring as the wheel is turned is compensated for by causing it to act with less leverage. As the wheel turns back, the decrease in stress of the spring is similarly compensated for by increase in leverage. The force brought to bear upon the shaft and wheel is then always substantially the same.

Having thus described my invention, what I claim is—

1. In an indicating mechanism, the wheel provided with the series of movable indicating devices, each provided with an arm or handle by which it can be moved, substantially as and for the purpose set forth.

2. In an indicating mechanism, the wheel carrying a series of radially-movable indicating devices, each provided with a handle by which the wheel can be revolved and the indicating devices can be moved outward on the wheel, substantially as and for the purpose described.

3. In combination with the main portion of the indicator-wheel, the series of slides arranged thereon carrying display or indicator tablets, substantially as and for the purpose specified.

4. In combination with the main portion of the indicator-wheel, the series of slides carried thereby, having on their outer ends the marked indicating-plates, and the arms attached to the slides, substantially as and for the purpose shown.

5. In combination with the main portion of the wheel provided with the series of radial slots, as shown, the series of radial slides carrying the display devices, and the arms attached to the slides and playing in the slots in the wheel, substantially as and for the purpose set forth.

6. In an indicator, in combination with a rotary wheel, radially-movable indicating devices carried thereon, means for moving such devices on the wheel, and means for locking them against such movement until they are brought by revolution of wheel opposite a certain point, substantially as and for the purpose described.

7. In an indicator, in combination with the rotary wheel and the radially-movable indicating devices carried thereon, provided with arms or handles for moving them, a rigid guide engaging such arms and holding them against movement until they are brought opposite a determined point, substantially as and for the purpose specified.

8. In an indicator mechanism in which the indication is made always at the same point, a rotary wheel carrying movable indicating devices, and means, substantially as described, for locking such devices against movement until they are brought by rotation of the wheel to the indicating or display point, substantially as and for the purpose shown.

9. In an indicator mechanism, in combination with the rotary wheel and the series of radially-movable indicating devices on such wheel, the arms or handles for moving such devices, and a fixed circular guide adapted to prevent these arms moving outward, provided with the offset for allowing outward movement of any of the arms brought around to it by rotation of the wheel, substantially as and for the purpose set forth.

10. In an indicator mechanism, in combination with the rotary wheel, the radially-moving tablet carrying slides and the arms or handles attached thereto, the front of the casing provided with the opening having its edge just outside of the series of arms and provided with the offset or slot, substantially as and for the purpose described.

11. In combination with the circular series of arms or handles for moving the indicator devices, the casing-front provided with the circular opening, and the slot or offset from such opening beveled or inclined at one side, substantially as and for the purpose specified.

12. In an indicating mechanism, in combination with a series of movable tablets adapted to be moved along to bring any desired one of the tablets to a desired point where the same can be raised for display, a record-strip, suitable marking devices on the tablets to mark on the strip numbers corresponding with those on the tablets, and a lever above the tablet-raising point for depressing the record-strip against the marking device on a raised tablet, substantially as and for the purpose described.

13. In combination with the rotary wheel, the radially-movable indicating devices, each provided with marking devices for marking its respective number or mark, arranged upon its outer end, and the pressure-lever, substantially as and for the purpose set forth.

14. In combination with the rotary wheel, the radially-movable slides thereon carrying display devices, each provided upon its outer end with points so arranged as to mark the number or mark which the display device carries, and the lever above the wheel, provided with a yielding cushion on its under face, adapted to press a strip of paper down upon the upper end of any display device which has been raised on the wheel up under the lever, substantially as and for the purpose described.

15. In combination with the wheel provided with the series of radial slots, the radially-sliding rods on such wheel carrying the display devices, pins or arms attached to the rods and extending through the slots, and springs for drawing the rods inward on the wheel, substantially as and for the purpose specified.

16. In combination with the wheel, consisting, essentially, of the two parallel plates provided with corresponding series of radial slots, the radially-sliding rods or bars guided in suitable guides between the plates and carrying on their outer ends display-tablets, springs drawing such rods inward, and pins rigidly connected with the rods and playing in the slots in the plates of the wheel, substantially as and for the purpose shown.

17. In an indicating mechanism, in combination with the wheel and the radially-movable indicating devices thereon, adapted to be brought up to the point of display by rotation of the wheel, means for stopping the rotation of the wheel when the entire series of said devices has been brought to such point in succession, substantially as and for the purpose described.

18. In combination with the indicator-wheel and its pivot-shaft, the pulley on such shaft, the spring, and the cord attached to the spring and to the wheel at a point radially beyond the periphery of the pulley, so that after the wheel is turned forward a certain distance the cord will begin to be wrapped around the pulley, substantially as and for the purpose set forth.

19. In combination with the indicator-wheel, the pulley on the pivot-shaft thereof, the spring attached at one end to a fixed support, and the cord attached to the spring and to the wheel at a point radially beyond the periphery of the pulley, substantially as and for the purpose described.

20. In an indicating and registering mechanism, in combination with the rotary indicator-wheel provided with suitable indicating devices, the registering mechanism connected with such wheel, so as to be operated only as the wheel is turned forward, means for stopping the wheel when the last of the series of indicating devices is brought opposite the indicating-point, means for automatically turning the wheel backward, and suitable stop devices for stopping its backward rotation after the first one in the series of indicating devices has passed the indicating-point, substantially as and for the purpose specified.

21. In combination with the indicator-wheel provided with the fixed pin or stop, the swinging plate I, provided with the rib, and the stop limiting the outward swing of the plate, substantially as and for the purpose specified.

22. In combination with the rotary wheel and the pin on the same, the swinging plate I, having the rib to be engaged by the pin, the stop to limit the swing of the plate, and the spring drawing the plate outward toward the stop, substantially as and for the purpose shown.

23. In combination with the rotary wheel provided with the series of radially-movable indicating devices having pins projecting from the wheel, the swinging plate, a spring tending to keep the plate away from the path of the pins on the indicating devices as such devices are raised to make indications, a rib on the plate, and a pin on the wheel adapted to engage the rib and swing the plate inward across the said path of the pin when the wheel is at its starting-point, substantially as and for the purpose set forth.

24. In combination with the wheel and the radially-movable indicating devices thereon provided with pins, the swinging plate I, provided with rib I², the stop for limiting the swing of the plate, and the spring tending to swing the plate against the stop and the pin on the wheel, substantially as and for the purpose described.

25. In an indicating mechanism, in combination with the wheel and the series of radially-movable indicating devices thereon provided with pins, a suitable passage-way up which the pins on the indicating devices can pass as such devices are raised to make an indication, the swinging plate adapted to stand across this passage as it is swung inward, a spring to swing the plate outward, and a pin on the wheel engaging a rib on the plate to swing it inward when the wheel is at its starting-point, substantially as and for the purpose specified.

26. In combination with the rotary wheel carrying the radially-movable indicating devices and the pins on such devices, the plate adapted to be swung inward across the way up which the pins on the indicating devices move as such devices are raised on the wheel, a spring tending to swing it inward, a pawl-lever for holding it outward adapted to be engaged by any pin moved up the way and caused to release the plate, the swinging setting-plate adapted to move the former plate outward again, and a pin on the wheel adapted to engage such setting-plate when the wheel is turned back to its starting-point, substantially as and for the purpose shown.

27. In combination with the wheel carrying the series of radially-movable indicating devices provided with pins projecting from the wheel, the pawl in the passage up which the pins are moved as the respective indicating devices are raised, adapted to lock such pins as raised, an alarm mechanism adapted to be tripped by the pins, and means for moving the pawl at will, substantially as and for the purpose set forth.

28. In combination with the plate F and the spring for swinging it inward across the way for the pins on the indicating devices when such devices are raised to make an indication, the pawl-lever crossing such way and engaging and holding the plate normally away from the way, substantially as and for the purpose described.

29. In combination with the rotary wheel and the series of outwardly-movable indicating devices thereon provided with pins, a way or passage up which any of the pins can be moved by raising its respective indicating device and means for closing such way after a pin has been raised up in it and lowered again, substantially as and for the purpose specified.

30. In combination with a movable indicating device and the pin thereon, a swinging plate, a spring acting to throw the plate inward across the way up which the pin passes as the indicating device is raised, and a pawl-lever for holding the plate outward from the way, adapted to be struck by a pin passing up the way, substantially as and for the purpose shown.

31. In combination with suitable guides, a movable indicating device having a pin or projection adapted to be moved between the guides as the indicating device is moved to make an indication, the swinging plate, the spring pressing it inward, the pawl holding it outward, adapted to be tripped by the pin, the striker carried by the plate, and the bell, substantially as and for the purpose set forth.

32. In combination with suitable guides defining the way for the pin on a movable indicating device, the pawl for holding such pin as raised in the way, the pawl-lever crossing such way, the swinging plate normally held from the way by the pawl-lever, the spring swinging the plate inward across the way when the plate is released, the striker carried by the plate, and the bell, substantially as and for the purpose described.

33. In combination with suitable guides, forming a way between them, the swinging plate adapted when swung inward to bar the way, the spring pressing it inward, the pawl-lever crossing the way, adapted to hold the plate outward, the swinging plate on the other side of the way, having the rib I², the stop L, the spring holding such plate outward from the way, the rotary indicator-wheel, and the fixed pin on the wheel, substantially as and for the purpose specified.

34. In combination with the wheel having the series of radially-moving indicating devices provided with pins projecting from the wheel, the plate having the pawl pivoted thereon and adapted to be brought into position to engage the pins when the plate is moved in one direction, and the pawl pivoted outside of the plate, engaging a pin or stud on the other pawl, and adapted to fall into position to engage the pins when the plate is moved in the other direction, substantially as and for the purpose shown.

35. In combination with the series of pins, the swinging plate, the pawl pivoted thereon so as to yield in one direction, and the second pawl resting on a stud or pin on the other pawl, all so arranged that as the plate is moved in opposite directions the pawls will be alternately brought into position to engage the series of pins, substantially as and for the purpose set forth.

36. In combination with the swinging plate F, the pawl pivoted thereon, the pawl H, resting on a pin or stud on the former pawl, a spring for actuating the pawl H, and the pawl-lever F', for holding the plate, substantially as and for the purpose described.

37. In combination with the rotary wheel and the radially-movable indicating devices thereon provided with pins, two pawls, one adapted to engage the pins so as to allow forward rotation of the wheel and the other to engage them so as to allow the wheel only to revolve back, and means, substantially as described, for causing the first to act before an indication is made and then throwing the other into action, substantially as and for the purpose specified.

38. In combination with the swinging plate F and the pawl pivoted thereon, the second pawl pivoted outside of the plate and resting against a shoulder or stud on the other pawl, and the spring for actuating the pawl not pivoted on the plate, substantially as and for the purpose shown.

39. In combination with the indicator-wheel, the spring, the cord connected with both the wheel and the spring, and the eccentric pulley rigidly connected with the wheel so as to turn therewith, substantially as and for the purpose described.

In testimony that I claim the foregoing I have hereunto set my hand this 18th day of June, A. D. 1886.

CABEL B. HOPKINS.

Witnesses:
O. E. ROBINSON,
CHAS. W. CHAMBERS.